J. O. NIDERMAIER.
AUTOMOBILE LOCKING DEVICE.
APPLICATION FILED AUG. 20, 1920.
1,395,970.
Patented Nov. 1, 1921.
2 SHEETS—SHEET 2.
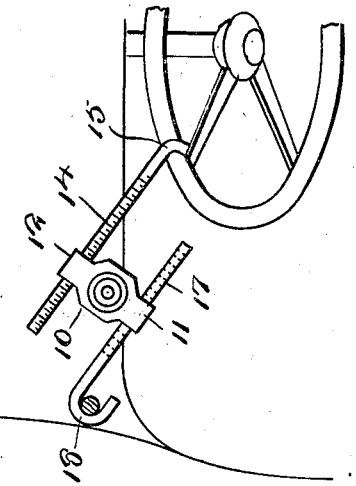
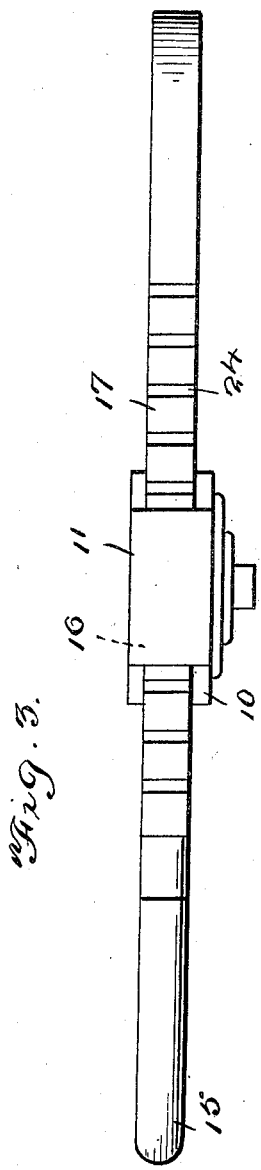
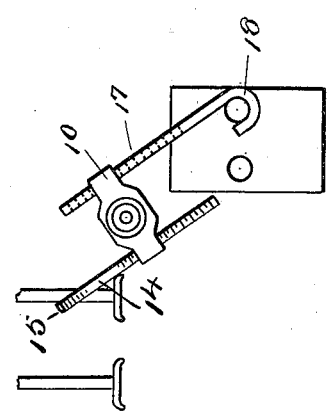
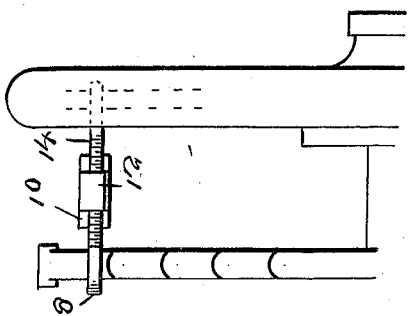
J. O. Nidermaier
INVENTOR
BY Victor J. Evans
ATTORNEY

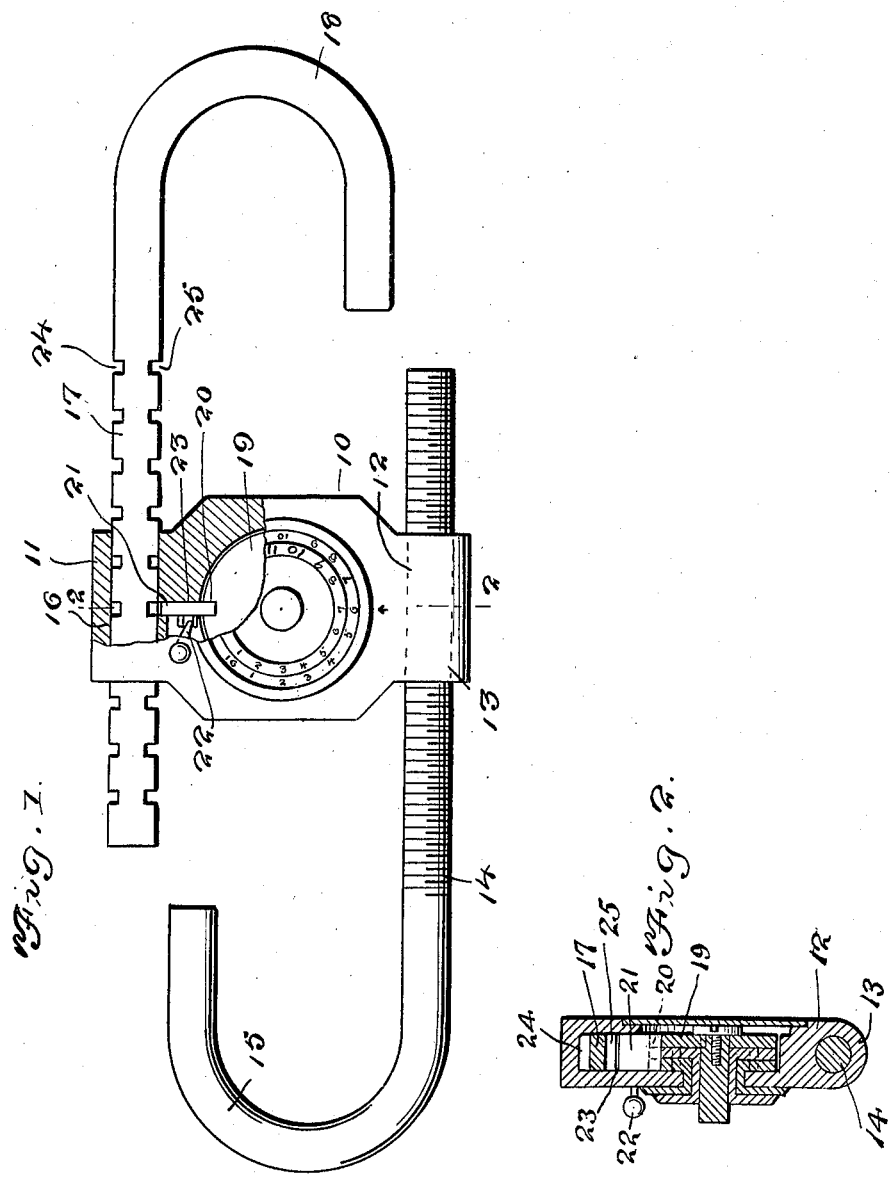

UNITED STATES PATENT OFFICE.

JOSEPH O. NIDERMAIER, OF WAR, WEST VIRGINIA.

AUTOMOBILE-LOCKING DEVICE.

1,395,970.  Specification of Letters Patent.  Patented Nov. 1, 1921.

Application filed August 20, 1920. Serial No. 404,733.

*To all whom it may concern:*

Be it known that I, JOSEPH O. NIDERMAIER, a citizen of the United States, residing at War, in the county of McDowell and State of West Virginia, have invented new and useful Improvements in Automobile-Locking Devices, of which the following is a specification.

This invention relates to safety devices for automobiles whereby to prevent them from being stolen and has for its object the provision of a locking device formed as a shackle operable to hook the emergency brake lever to the gear shift lever, to hook onto a spring and a wheel spoke, to hook the steering wheel to the wind shield frame, to secure the clutch pedal and brake pedal together, or to secure the gas trottle lever and spark control lever together, whereby to prevent the automobile from being driven, it being conceivable that the device might also be used in other locations, depending upon the make of automobile.

An important and more specific object is the provision of a lock of this character which includes a pair of relatively movable hooks engageable about the different levers to be secured and adjustable relatively to each other whereby such engagement may be made, the hook members being associated with a lock casing provided with a combination lock whereby the annoyance incidental to the use of keys will be prevented.

An additional object is the provision of a device of this character which will be simple and inexpensive in manufacture, highly efficient in use, easy to apply, durable in service, and a general improvement in the art.

With the above and other objects and advantages in view, the invention consists in the details of construction to be hereinafter more fully described and claimed and illustrated in the accompanying drawings in which—

Figure 1 is an elevation of my device showing it in unlocked position,

Fig. 2 is a cross sectional view therethrough on the line 2—2 of Fig. 1,

Fig. 3 is an edge view, and

Figs. 4, 5 and 6 are elevations of my device in use and engaged upon different elements of the control of an automobile.

Referring more particularly to the drawings, the numeral 10 designates a casing which is formed at opposite sides with extensions 11 and 12. The extension 12 is provided with a threaded hole 13 into which is screwed the threaded shank 14 of a hook 15. The extension 11 is formed with a slot 16 within which is slidably engaged the rectangular shank 17 of a hook 18.

Mounted within the casing 10 is a combination lock of conventional type including a plurality of rotatable disks 19 formed with notches 20 adapted to be brought into registration by rotating the individual disk to the proper degree. The numeral 21 designates a locking bolt which is slidably mounted within a slot 23 intersecting the opening 16 and which is adapted to be retracted into the slots 20 when the latter are in registration. This bolt 21 is engaged by a pivoted shifting lever 22 having an operating knob as shown. The shank 17 of the hook 18 is provided in opposite sides with series of notches 24 and 25 within any one of which may be engaged the bolt 21 for holding the parts in locked position.

The operation of the device is as follows:

When the lock is in open position the hook 18 may be slid along the slot 16 to give it the proper adjustment so that it will coöperate with the hook 15. The hook 15 is adjusted by screwing the shank 14 into or out of the threaded hole 13. It is of course necessary that these hooks be interengaged upon the elements to be locked whereupon the hook 18 or rather the shank 17 thereof will slide along the slot 16 until both the hooks 15 and 18 firmly engage the elements to be held. The operator then moves the lever 22 to force the bolt 21 into one of the notches 24 or 25 and then rotates the disks 19 so that the notches 20 therein will be out of registration with one another and the bolt 21. The elements engaged by the hooks will then be prevented from relative movement and an automobile will thus be locked. When it is desired to unlock the parts the disks 19 are rotated to the proper extent to bring the notches 20 therein into registration so that they will receive the bolt 21 when the latter is retracted, by means of the lever 22, from engagement with any of the notches 24 or 25. When this is done the hook 18 may be slid away from the casing 10 so that both hooks 15 and 18 may then be disengaged from the elements of the automobile. In some instances it is desirable to have the hooks 15 and 18 substantially in alinement, in which event the hook 18 is turned into the position shown in Fig. 1 with the notches 25 in position to coöperate with the bolt 21. In some other instances it may be found advisable to turn the hook 18 in the opposite direction. In such an event the shank 17 is entirely removed from the slot 16, is turned half way around and then reinserted. In this case the notches 24 will coöperate with the bolt 21. In other cases it might be desired to dispose both hooks at one side of the casing, an arrangement easily made by withdrawing the hook 18 from the casing and then reinserting it from the other side.

From the foregoing description and a study of the drawings it will be apparent that I have thus provided a comparatively simple and very easily operated locking device for rigidly securing element of the control of an automobile against relative movement so that driving of the automobile by an unauthorzed person will be prevented.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A locking device comprising a casing provided at opposite sides with extensions, one extension being formed with a threaded hole and the other being formed with a slot, a hook having a shank screwed into said threaded hole, a second hook having a shank slidable through said slot, and locking means carried by said casing for holding said second named hook against movement.

2. A locking device comprising a casing provided at opposite sides with extensions, one extension being formed with a threaded hole and the other being formed with a slot, a hook having a shank screwed into said threaded hole, a second hook having a shank slidable through said slot, and locking means carried by said casing for holding said second named hook against movement, said means comprising a bolt slidable within said casing, the shank of said second named hook being formed with a series of notches adapted to receive said bolt, rotatable disks carried by the casng and having notches to receive said bolt to permit retraction thereof from engagement with said second named hook shank, and means for moving said disks to bring the notches therein into registration with said bolt.

In testimony whereof I affix my signature.

JOSEPH O. NIDERMAIER.